United States Patent [19]
Murakami

[11] Patent Number: 5,617,012
[45] Date of Patent: Apr. 1, 1997

[54] POWER CONVERTER PROTECTING APPARATUS FOR ELECTRIC POWER SYSTEM

[75] Inventor: Shotaro Murakami, Tokyo, Japan

[73] Assignee: Mitsubishi Denki Kabushiki Kaisha, Tokyo, Japan

[21] Appl. No.: 592,463

[22] Filed: Jan. 26, 1996

[30] Foreign Application Priority Data

Jun. 27, 1995 [JP] Japan .................................. 7-161153

[51] Int. Cl.$^6$ .................................................. H02H 7/125
[52] U.S. Cl. ........................................................ 323/207
[58] Field of Search ........................ 363/52–58; 361/42, 361/57, 59, 61, 67, 93, 111, 118; 323/207

[56] References Cited

U.S. PATENT DOCUMENTS 5,309,346  5/1994  Gyugyi ..................................... 363/54

FOREIGN PATENT DOCUMENTS

| | | |
|---|---|---|
| 54-152141 | 11/1979 | Japan . |
| 55-56425 | 4/1980 | Japan . |
| 55-140918 | 11/1980 | Japan . |
| 55-141932 | 11/1980 | Japan . |

*Primary Examiner*—Aditya Krishnan
*Attorney, Agent, or Firm*—Leydig, Voit & Mayer

[57] ABSTRACT

A power converter protecting apparatus include series transformers connected in series to phase power lines, respectively, of an electric power system, power converters connected to secondary windings of the transformers, respectively, a current detector for detecting system currents flowing through the phase power lines, a current detector for detecting converter currents flowing to the power converters from the secondary windings, respectively, a high-speed decision circuit for outputting a decision signal upon determination of occurrence of a system fault on the basis of the system current, a switch for issuing an output voltage zero command upon reception of the fault decision signal, and a pulse generating circuit for controlling a gate pulse signal supplied to the power converters for setting to zero the outputs of the power converters in response to the output voltage zero command at a time point when the converter current decreases below an allowable breaking current thereof.

10 Claims, 13 Drawing Sheets

NORMAL FIRING PULSE

FIRING PULSE IN SYSTEM FAULT

POWER CONVERTER PROTECTING APPARATUS FOR ELECTRIC POWER SYSTEM

BACKGROUND OF THE INVENTION

1. Field of the Invention

The present invention relates to a power converter protecting apparatus for protecting power converters connected in series or parallel to an electric power system for stabilization thereof against a system fault and/or a short-circuit fault.

2. Description of Related Art

For having better understanding of the invention, background techniques thereof will briefly be reviewed. FIG. 14 is a schematic circuit diagram showing a configuration of a conventional power converter connected in series to an electric power system which is disclosed in, for example, in "Transactions in The National Convention of Industrial Applications Section of The Institute of Electric Engineers of Japan", (1993), No. 103, p. 444. Referring to the figure, a self-excitation type SVC (hereinafter referred to as the power converters) is connected to the secondary winding of a series transformer 2 having a primary winding connected to a phase power line of an electric power system 1. The power converter 3 is implemented in the form of a three-phase bridge circuit comprised of gate turn-off switching elements such as thyristors (hereinafter referred to as the GTO switching elements) 3c1 to 3c6 to which diodes D are connected in anti-parallel, respectively, wherein a DC capacitor 6 for supplying a DC voltage is connected between the DC input lines with AC output lines being connected to the secondary winding of the series transformer 2.

Traditionally, the power converter 3 is connected in parallel to the electric power system 1 for the purpose of generation of reactive power and consumption thereof with a view to ensure stabilization for the electric power system. Besides, by connecting the power converters 3 in series to the electric power system 1, it is possible to change impedance of the electric power system 1. Thus, the power converters serve as very effective means for stabilizing the electric power system.

More specifically, the power converter serves for generating constantly an AC voltage orthogonal to a system current flowing through the electric power system. Thus, impedance of the electric power system can be changed in appearance by changing the amplitude of the AC voltage, which is functionally equivalent to a continuous control of a capacitor connected in series to the electric power system 1 and which can thus ensure very high effectiveness in realizing the stabilization of the electric power system. Besides, because the power converter 3 always generates the AC voltage orthogonal to the system current, necessity of providing a valid power supply source at the DC side of the power converter 3 can be eliminated.

In the conventional power converter apparatus known heretofore of the structures described above, the power converters connected in series to the electric power system are very effective for the stabilization of the electric power system. However, because of the serial connections of the power converters to the electric power system, an overvoltage may unwantedly make appearance in the electric power system upon occurrence of a fault in the electric power system or occurrence of a fault in the power converter apparatus or upon shut-down of the power converters and hence upon interruption of the system current. Thus, great difficulty is encountered in the protection and control of the power converter apparatus known heretofore.

SUMMARY OF THE INVENTION

In the light of the state of the art described above, it is a general object of the present invention to provide a power converter protecting apparatus which is capable of controlling the power converters connected in series to an electric power system by allowing a system current to flow in continuation even upon occurrence of a fault in the electric power system.

In view of the above and other objects which will become apparent as the description proceeds, there is provided according to an aspect of the present invention a power converter protecting apparatus which includes transformers connected in series to phase power lines, respectively, of an electric power system, power converters connected to secondary windings of the transformers, respectively, a first current detecting means for detecting system currents flowing through the phase power lines, a second current detecting means for detecting converter currents flowing to the power converters from the secondary windings, respectively, a fault decision means for outputting a decision signal upon decision of occurrence of a system fault on the basis of the system current, an output voltage command means for issuing an output voltage zero command upon reception of the fault decision signal, and a control signal output means for supplying a control signal to the power converters for setting to zero the outputs of the power converters in response to the output voltage zero command when the converter current as detected during occurrence of the system fault decreases below an allowable breaking current of the power converters.

With the structure of the power converter protecting apparatus described above, the output voltage of the power converter which outputs an AC voltage orthogonally to the system current is so controlled as to become substantially zero upon detection of occurrence of a fault in the electric power system on the basis of the system current flowing through the power line by commutating the converter current of the power converter to fly-wheel diodes conventionally incorporated in the power converter so that the converter current flow through the fly-wheel diodes while bypassing the switching elements of the power converter. Thus, the power converter can be protected from destruction or damage due to a large current produced upon occurrence of the system fault. Further, the fault current can bypass the switching elements constituting the power converter without need for additional provision of a device designed especially to this end. Moreover, the operation of the power converter apparatus can be restarted instantly upon removal of the system fault. Thus, according to the first aspect of the invention there is provided the power converter protecting apparatus which can be implemented with high reliability at low cost.

In a preferred mode for carrying out the invention, the power converter protecting apparatus may further include a circuit breaker connected in parallel with each of the secondary windings of the transformers, and a delay circuit for outputting a closing signal to the circuit breaker upon reception of the fault decision signal from the fault decision means in continuation over a predetermined time period.

In the power converter protecting apparatus described above, the output voltage of the power converter is so controlled as to be set to zero when the system fault continues to exist over a period which exceeds a permissible current conducting time of the switching elements constituting the power converter, while the circuit breaker connected in parallel to the secondary winding of the transformer is closed to thereby allow the converter current to flow through the circuit breaker by bypassing the power converter. Owing to such arrangement, the power converter can be protected against a large fault current even when the system fault continues to exist for an extended period. Thus, the reliability of the power converter protecting apparatus can further be enhanced.

Further provided according to another aspect of the invention is a power converter protecting apparatus which includes series transformers connected in series to phase power lines, respectively, of an electric power system, power converters connected to secondary windings of the series transformers, respectively, semiconductor switching elements each connected in parallel to each of the secondary windings of the series transformers, respectively, a first current detecting means for detecting system currents flowing through the phase power lines, respectively, and a system fault decision means for outputting a turn-on signal to the semiconductor switching elements and outputting simultaneously a turn-off signal to the power converters upon decision of occurrence of a system fault on the basis of the system current as detected.

With the arrangement of the power converter apparatus described above, the semiconductor switching element connected in parallel to the secondary winding of the series transformer is turned on upon detection of the system fault and at the same time the switching elements constituting the power converter are turned off to allow a large fault current to flow through the semiconductor switching element by bypassing the power converter switching elements. Thus, the protection of the power converter can be ensured with a simple and inexpensive structure.

In another preferred mode for carrying out the invention, the power converter protecting apparatus which includes the semiconductor switching elements as described above may further include a circuit breaker which is connected in parallel with each of the secondary windings of the series transformers, and a delay circuit for outputting a closing signal to the circuit breaker upon reception of the fault decision signal from system fault decision means in continuation over a predetermined time period.

With the arrangement of the power converter apparatus described above, the semiconductor switching element connected in parallel to the secondary winding of the transformer is turned on upon detection of the system fault and at the same time the switching elements constituting the power converter are turned off to allow a large fault current to flow through the semiconductor switching element while bypassing the power converter switching elements. Subsequently, when the system fault continues to flow over a period which exceeds the allowable limit time of the semiconductor switching element, the circuit breaker connected in parallel to the secondary winding of the series transformer is closed to thereby allow the fault current to flow through the circuit breaker by bypassing the semiconductor switching element. By virtue of such arrangement, the semiconductor switching element of a small current capacity and a small thermal capacity can be used, which is advantageous in that the power converter protecting apparatus can be realized inexpensively on a small scale.

In yet another preferred mode for carrying out the invention, the power converter protecting apparatus may further include an arrester which is provided in association with the secondary winding of each of the serial transformers for the purpose of prevent an overvoltage from being applied to the power converter.

With the arrangement of the power converter apparatus described above, the overvoltage which may make appearance when the secondary side of the transformer is opened due to a fault of the power converter can be coped with by the arrester connected in parallel to the secondary winding of the transformer. Thus, the power converter can be protected against application of the overvoltage. In other words, the protection of the power converter can be achieved with higher reliability.

According to a further aspect of the invention, there is provided a power converter protecting apparatus which includes series transformers having primary windings connected in series to phase power lines, respectively, of an electric power system, each of the series transformers having a secondary winding divided into a plurality of winding sections, groups of power converters provided for the phase power lines, respectively, of the electric power system and connected to the secondary winding sections of the transformers, respectively, wherein one DC input lines of the power converters connected to the secondary sections of a same stage of the transformers provided for the phase power lines, respectively, are connected together in common and led to DC capacitors via protecting fuses, respectively, a short-circuit detecting means provided in association with the power converters, respectively, for detecting occurrence of a short-circuit fault in the power converter, a short-circuit decision means for determining the secondary winding section to which the power converter suffering from a short-circuit fault is connected on the basis of a short-circuit detection signal outputted by the short-circuit detecting means, and an enforcive firing circuit responding to decision of occurrence of a short-circuit fault in a given one of the power converters for thereby breaking the protecting fuse connected in common to the DC input lines of the power converters provided for the phase power lines, respectively, and connected to the secondary winding sections, respectively, of a same stage as the secondary winding section to which the given power converter suffering the short-circuit fault is connected.

By virtue of the structure of the power converter protecting apparatus described above, a redundant system can be realized because each of the secondary winding of the serial transformers each inserted in series to the power line of electric power system is divided into a plurality of sections with a corresponding number of the power converters being provided for each of the power lines, wherein upon occurrence of a fault in a given one of the power converters provided for a given one of the power lines, all the switching elements of those power converters provided for other power lines and connected to the same secondary winding sections as the given one power converter are turned on to thereby fuse the protecting fuse and disconnect all the power converters connected to the same secondary winding sections. The system operation can continuously be sustained by the other power converters connected to the other secondary winding section(s). Thus, a fail-safe feature of the power converter protecting apparatus can be realized at low cost on a small size scale.

In a still another preferred mode for carrying out the invention directed to the power converter protecting apparatus described just above, there may further be provided circuit breakers which is connected in parallel to the secondary windings of the transformers, respectively, and delay circuits each of which is provided for delaying the closing signal supplied to the associated circuit breaker with a delay of a predetermined time after decision of the short-circuit fault by the short-circuit decision means.

By virtue of the redundant implementation of the power converter protecting apparatus as described above in which a plurality of power converters are provided for each of the power lines, wherein upon occurrence of a fault in a given one of the power converters provided for a given one of the power lines, all the switching elements of those power converters provided for other power lines and connected to the same secondary winding sections as the given one power converter are turned on to thereby fuse the protecting fuse and disconnect all the power converters connected to the same secondary winding sections. Subsequently, the circuit breakers connected in parallel to the same secondary winding sections are closed to cause the short-circuit currents to bypass the relevant power converters by flowing through the circuit breakers. Thus, even when the short-circuit fault continues to exist for an extended period, the sound power converters (i.e., the power converters suffering no fault) can be protected against damage or destruction.

In a further preferred mode for carrying out the invention directed to the power converter protecting apparatus described just above, the power converter protecting apparatus may include series transformers connected in series to phase power lines, respectively, of an electric power system, power converters connected to secondary windings of the series transformers, respectively, a first current detecting means for detecting system currents flowing through the phase power lines, a second current detecting means for detecting converter currents flowing to the power converters from the secondary windings, respectively, a fault decision means for outputting a decision signal upon decision of occurrence of a system fault on the basis of the detected system current, an output voltage command means for issuing an output voltage zero command upon reception of the fault decision signal, a control signal output means for controlling a control signal supplied to the power converters for setting to zero the outputs of the power converters in response to the output voltage zero command at a time point when the converter current as detected during occurrence of the system fault decreases below an allowable breaking current of the power converters, and a delay circuit for outputting a closing signal to the circuit breaker connected in parallel to the secondary windings of the transformers, respectively, with a delay of a predetermined time after decision of a short-circuit fault in the power converters as determined by the decision means or with a delay of a predetermined time after the decision of occurrence of a system fault made by the fault decision means.

With the arrangement of the power converter protecting apparatus of the redundant structure described above, the converters can be protected against not only the system fault but also the short-circuit fault. Thus, the reliability of the power converter protecting apparatus can be highly improved.

In a yet further preferred mode for carrying out the invention, the power converter protecting apparatus may further include disconnecting switches, each of which is inserted in series in a DC input line and an AC output line of each of the power converters.

With the structure of the power converter protecting apparatus described above, the disconnecting switches connected to the DC input side and the AC output side, respectively, are opened in the state in which the short-circuit current is shunted by the circuit breakers. Thus, the power converter suffering from the fault can be removed without need for shutting down the operation of the electric power system. In other words, the power converter protecting apparatus is improved in respect to the maintenance susceptibility thereof.

In a still further preferred mode for carrying out the invention, the power converter protecting apparatus may be so designed as to protect the power converters connected in parallel to the electric power system in place of the serially connected power converters against a system fault and/or a short-circuit fault.

In the power converter protecting apparatus described above, the power converters connected in parallel to the electric power system can be protected against the system fault and/or the short-circuit fault.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
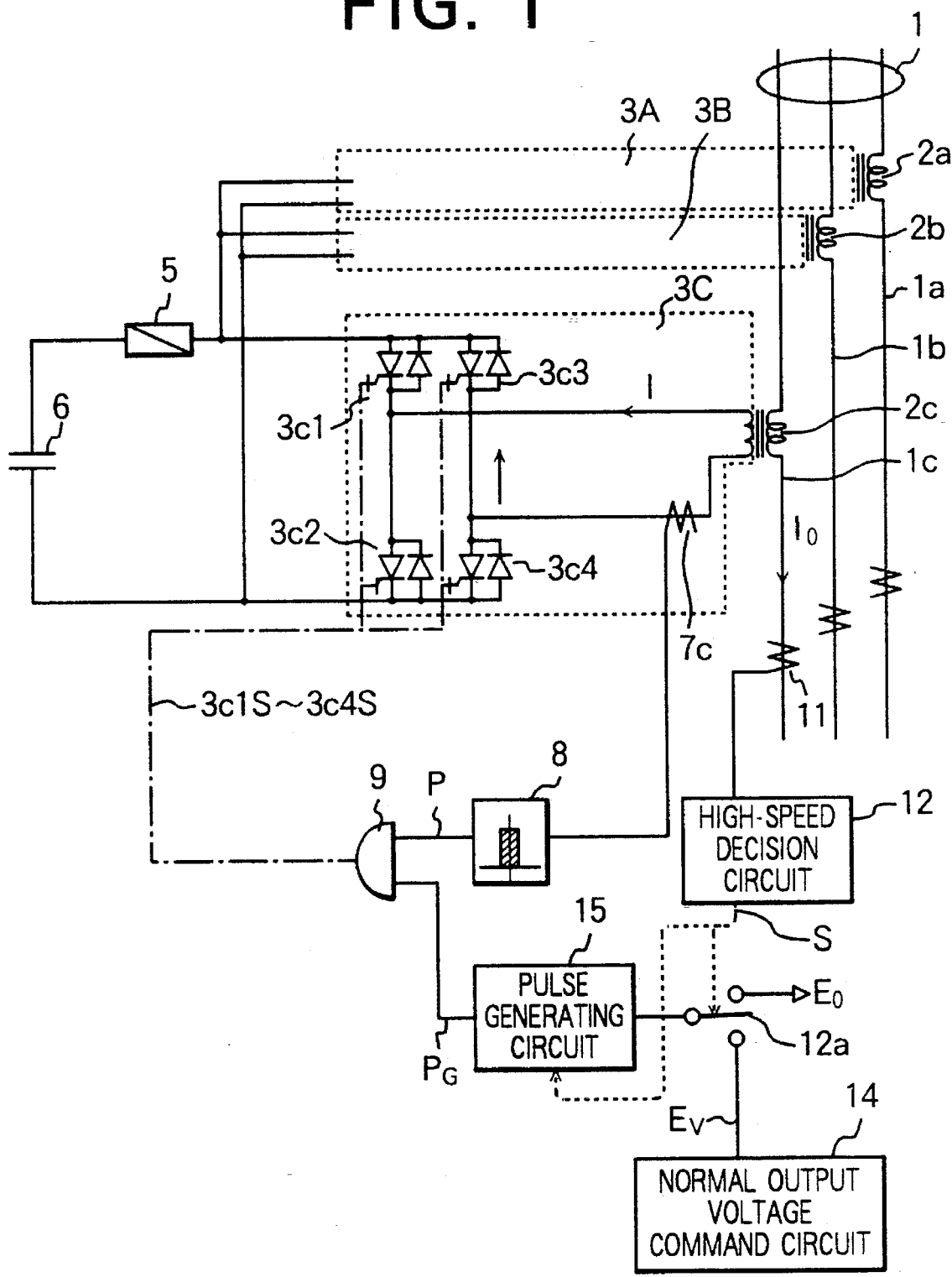
FIG. 1 is a schematic circuit diagram showing generally a circuit configuration of a power converter protecting apparatus according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

A first embodiment of the present invention will be described by reference to the drawings. FIG. 1 is a schematic circuit diagram showing generally a circuit configuration of a power converter protecting apparatus according to the first embodiment of the invention. Referring to the figure, the power converter protecting apparatus includes series transformers 2a to 2c having primary windings connected to phase power lines 1a to 1c of an electric power system 1, respectively, wherein power converters 3A to 3C are connected to the secondary windings of the series transformers 2a to 2c so that the secondary currents (converter current) I of the series transformers 2a to 2c, respectively, flow to the power converters 3A to 3C, respectively. The input lines of positive or plus polarity (hereinafter referred to as the plus input lines) of the power converters 3A to 3C are connected in common and led to one end of a DC capacitor 6 by way of a protecting fuse 5, while the input lines of negative or minus polarity (hereinafter referred to as the minus input lines) are connected together and led to the other end of the DC capacitor 6.

A structure of the protecting circuit for the power converter 3C will be described representatively of those for the power converters 3A to 3C, being understood that the following description equally applies to the protecting circuits for the latter. The protecting circuit now under consideration is composed of a current detector 7c serving as a second current detecting means for detecting the converter current I of the series transformer 2c, a current decision circuit 8 for outputting a pulse signal when the instantaneously value of the converter current I is lower than a permissible or allowable value, a current detector 11 serving as a first current detecting means for detecting a system current $I_0$, a high-speed decision circuit 12 serving as a fault decision means for deciding occurrence of a system fault on the basis of the system current $I_0$ detected by the current detector 11 to thereby output a decision signal S when occurrence of a system fault is decided, a switch 12a which responds to the input of the decision signal S to be thereby changed over to a contact position for validating an output voltage zero command $E_0$ for the power converter 3C while otherwise being positioned to receive a normal output voltage command $E_V$ from a normal output voltage command circuit 14 (which serves as an output voltage command means), a pulse generating circuit 15 which responds to the output voltage zero command $E_0$ supplied by way of the switch 12a to thereby select a first triangular waveform signal used for generating a single gate pulse (single pulse) per one cycle while responding to the input of the normal output voltage command $E_V$ via the switch 12a to thereby select a second triangular waveform signal used for generating a plurality of gate pulse (multiple pulses) per one cycle, for generating a PWM (pulse-width modulated) gate pulse $P_G$ by comparing the second triangular waveform signal as selected with a control voltage indicative of an output voltage command, and an AND circuit 9 which responds to the input of the pulse signal P from the current decision circuit 8 to thereby allow the gate pulses $P_G$ outputted from the pulse generating circuit 15 to act as firing signals 3c1S to 3c4S for turning on the GTO witching elements 3c1 to 3c4 (such as gate turn-off thyristors), respectively. At this juncture, it should be mentioned that the current decision circuit 8, the AND circuit 9 and the pulse generating circuit 15 cooperate to constitute a control signal output means.

Next, operation of the power converter protecting apparatus according to the instant embodiment of the invention will be described. As described previously, the series transformers 2a, 2b and 2c are inserted serially in the phase power lines 1a, 1b and 1c, respectively, of the electric power system 1. Accordingly, the converter current I of the value determined by the turn ratio is induced in the secondary side of each of the series transformers 2a, 2b and 2c. Thus, the series transformer (designated representatively by a reference numeral 2) operates in a manner similar to a current transformer. In the power converter system described above, generation and control of the AC voltage orthogonal to the system current $I_0$ by means of the power converters 3A, 3B and 3C are equivalent to insertion of variable impedance elements in the power line, respectively, of the electric power system in appearance for the purpose of ensuring stabilization of the electric power system.

Figure 2:
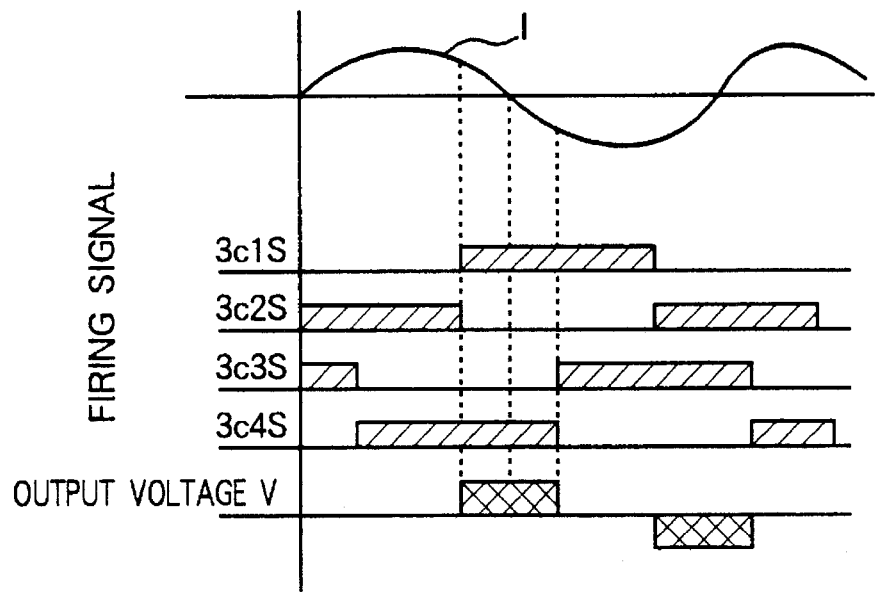
FIG. 2 is a timing chart showing a relation between firing signals and a system current in a power converter protecting apparatus according to the first embodiment of the invention for illustrating operation of the power converter in the state in which the electric power system operates normally.

Now, referring to FIG. 2 which shows a timing chart, description will be directed to the operation of the power converter 3C representatively of the other power converters 3A and 3B on the assumption that the electric power system is in the normal state. So long as occurrence of a fault in the electric power system 1 is not detected by the high-speed decision circuit 12 on the basis of the converter current I detected by the current detector 11, the switch 12a is changed over to the contact position connected to the normal output voltage command circuit 14 in response to the decision signal S, as a result of which a control voltage based on the normal output voltage command $E_V$ is inputted to the pulse generating circuit 15 via the switch 12a.

The pulse generating circuit 15 compares the control voltage with the preselected first triangular waveform voltage to thereby output firing signals 3c1S, 3c2S, 3c3S and 3c4S, each containing one pulse, to the GTO switching elements 3c1, 3c2, 3c3 and 3c4, respectively, with the timing illustrated in FIG. 2. Of the four firing signals 3c1S to 3c4S, the firing signals (gate signals) 3c1S and 3c2S on one hand and the firing signals (gate signals) 3c3S to 3c4S are mutually deviated by 180°, respectively, in respect to the phase of the on-level period (duty period) and bear exclusive relation to each other. The firing signals 3c1S to 3c4S have a same pulse width.

More specifically, the widths of the firing pulses as well as the output timings thereof are so determined as to prevent the GTO switching elements 3c1 and 3c2 belonging to the same arm of the converter bridge circuit from being simultaneously turned on for the purpose of preventing occurrence of a short-circuit fault in the DC line. Further, for generating the output voltage V in accordance with the normal output voltage command $E_V$, the phases of the firing signals 3c2S and 3c4S are deviated from each other. As a result of this, the phases of the firing signals (gate signals) 3c2S and 3c4S on one hand and the firing signals (gate signals) 3c2S and 3c3S on the other hand are superposed with each other for a predetermined time during the firing signal output period.

The GTO switching elements 3c1 to 3c4 are turned on in response to the firing or gate signals 3c1S to 3c4S, respectively, whereby DC voltages of plus and minus polarities are generated, respectively. Thus, a converter output voltage V conforming to the normal output voltage command $E_V$ is generated. The control of the converter output voltage V can be accomplished by increasing or deceasing those portions of the output periods during which the firing signals 3c1S and 3c4S on one hand and the firing signals 3c2S and 3c3S on the other hand are superposed with each other.

The firing signals 3c1S to 3c4S are outputted, respectively, to the GTO switching elements 3c1 to 3c4 with timings illustrated in FIG. 2, whereby the GTO switching elements 3c1 to 3c4 are repetitively turned on and off. Every time the GTO switching element is turned off, the converter current I flowing therethrough is interrupted at the current value at that time point. In the case where the firing signal is a single gate pulse, the converter current I is interrupted at the current value shown in FIG. 2. However, when the firing signal is constituted by multiple gate pulses, the GTO switching elements 3c1 to 3c4 are repetitionally turned on and off at the time points corresponding to the gate pulses, respectively.

When the system current $I_0$ of a magnitude which is several times as large as that of rated current flows upon occurrence of a system fault, a correspondingly large converter current I flows to each of the power converters 3A, 3B and 3C (hereinafter the power converters will also be collectively designated by reference numeral 3), which current is determined by the turn ratio of the series transformers 2a, 2b and 2c (also collectively designated by numeral 2). In that case, when the GTO switching elements 3c1 to 3c4 repeat the turn-on/off operations with the firing signals each containing multiple pulses to thereby interrupt or chop the system current $I_0$ regardless of the magnitude of the instantaneous value thereof, there may arise such situation that the power converters 3 stop the operation or fail to interrupt the system current $I_0$ when the system current $I_0$ exceeds the allowable current (i.e., current margin or current capacity) of the GTO switching element and reaches the protection level of the power converter 3, as a result of which the series transformers 2 are placed in the no-load state, incurring an overvoltage in the secondary windings of the respective serial transformers.

Next, operation for protecting the power converters performed upon occurrence of a system fault will be described by reference to a timing chart of FIG. 3. The high-speed decision circuit 12 makes decision whether a system fault has taken place or not on the basis of the value of the system current $I_0$ detected by the current detector 11. When occurrence of a system fault is determined, the switch 12a is changed over by the decision signal S to the contact position at which the control voltage corresponding to the output voltage zero command $E_0$ is inputted to the pulse generating circuit 15. In response to the output voltage zero command $E_0$, in the pulse generating circuit 15, the second triangular waveform voltage for generating the multiple-pulse signal is changed over to the first triangular waveform voltage for generating the single-pulse firing signal.

Thus, the pulse generating circuit 15 generates a PWM single-pulse signal by comparing the control voltage with the first triangular waveform voltage. At the time point when the instantaneous value of the converter current I becomes closer to zero and falls within the allowable current range, as illustrated in FIG. 3, the current decision circuit 8 outputs a pulse signal P of high level to the AND circuit 9.

Thus, when the converter current I falls within the allowable current range, the AND circuit 9 outputs the one pulse supplied from the pulse generating circuit 15 to the power converter 3C as the firing signals 3c1S to 3c4S. In FIG. 3, there are illustrated the firing signals 3c1S to 3c4S for the GTO switching elements 3c1 to 3c4, respectively, together with the converter current I upon occurrence of a system fault. As can be seen from the figure, the GTO switching elements 3c1 and 3c4 are turned on/off simultaneously, while the GTO switching elements 3c2 and 3c3 are turned on/off simultaneously with each other. Accordingly, no overlap of the on-period (i.e., the period during which the GTO switching element is conducting) takes place between the GTO switching elements 3c1 and 3c4 on one hand and between the GTO switching elements 3c2 and 3c3 on the other hand. Thus, the converter output voltage V assumes a value of zero. As a result, in the power converter 3C, only the fly-wheel mode is validated, whereby the converter current I is caused to flow through the fly-wheel diodes which are connected in anti-parallel to the GTO switching elements 3c1 to 3c4, respectively.

Although the converter current I may assume a large value corresponding to the system current $I_0$ in the system fault state, each of the GTO switching elements 3c1 to 3c4 is turned on/off at a time point when the converter current I becomes approximately zero. Thus, interruption of the overcurrent can be avoided. Besides, by employing the GTO switching element of such specifications which can withstand the fault current of short duration (e.g. 4 to 8 cycles), there arises practically no problems. The event described above is equivalent to occurrence of a short-circuit in the secondary windings of the series transformers, when viewed from the side of the electric power system. Accordingly, the power converters can be protected without need for additional provision of high-speed shunt circuits in association with the secondary windings of the series transformers 2, respectively.

As is apparent from the above, by virtue of the arrangement of the protecting apparatus according to the first embodiment of the invention, the power converters can be protected against shutdown and/or destruction due to a large current upon occurrence of the system fault. Further, because the fault current (i.e., current flowing upon occurrence of a fault in the electric power system can be shunted or bypassed by way of the fly-wheel diodes, not only the provision of the shunt circuits for the secondary windings of the series transformers 2 is rendered unnecessary but also the operation can be restored instantly upon clearing of the fault. Thus, there can be realized the protecting apparatus which can enjoy high reliability and which can be implemented inexpensively.

Embodiment 2

In the case of the power converter protecting apparatus according to the first embodiment of the invention, it is presumed that each of the GTO switching elements 3c1 to 3c4 has a capability of withstanding the fault current over a period ranging from 4 to 8 cycles. Accordingly, unless the fault is removed or cleared during this period, the fault current withstanding capability (i.e., allowable conducting current) of the GTO switching elements 3c1 to 3c4 may be exceeded.

Under the circumstances, it is proposed according to the invention incarnated in a second embodiment that in addition to the functions of the protecting apparatus of the first embodiment, a function is provided for suppressing the conducting current of the GTO switching elements 3c1 to 3c4 to within the allowable conducting current range.

Figure 4:
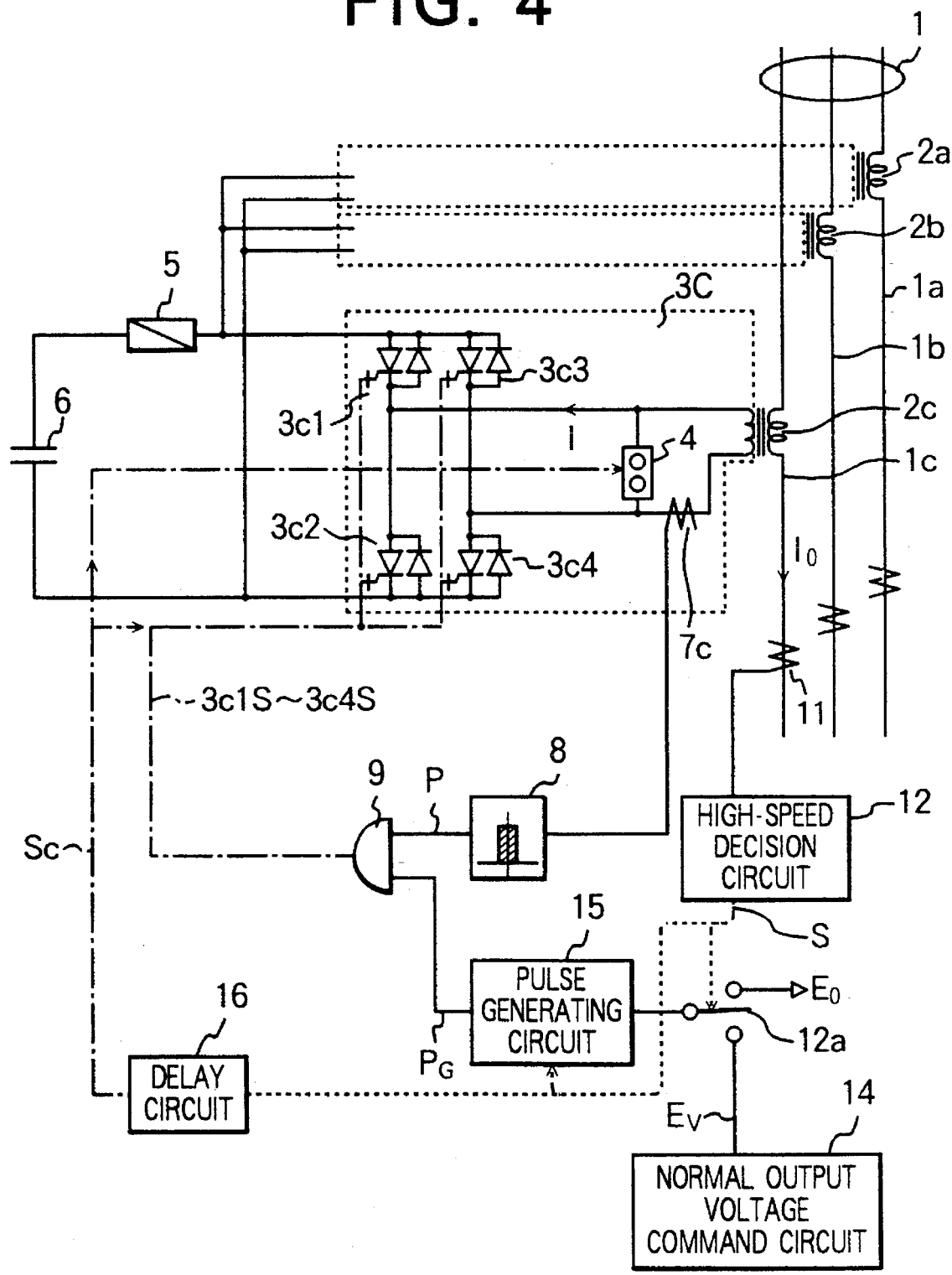
FIG. 4 is a schematic circuit diagram showing a structure of a power converter protecting apparatus according to a second embodiment of the present invention.

FIG. 4 is a schematic circuit diagram showing a structure of a power converter protecting apparatus according to the second embodiment of the present invention. In the figure, like reference symbols as those used in FIG. 1 denote like or equivalent components shown in FIG. 1. Referring to FIG. 4, a circuit breaker 4 is connected between the AC output lines of each of the power converters 3. Furthermore, there is additionally provided a delay circuit 16 which serves to input an breaker control signal $S_C$ upon disappearance of the decision signal S indicating the system fault event.

Figure 5:
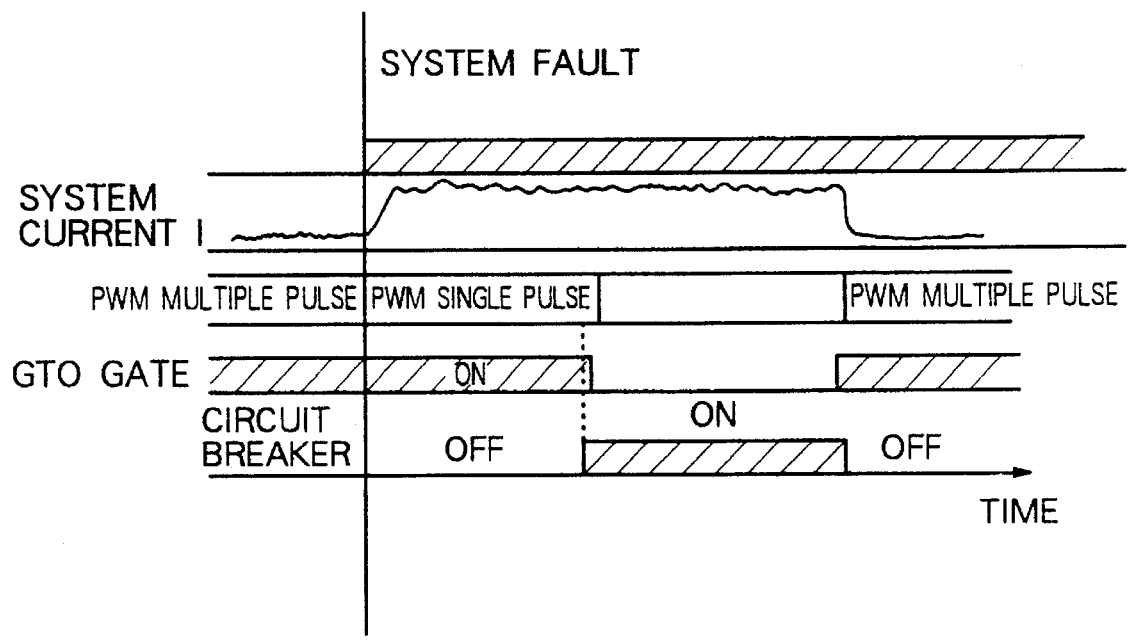
FIG. 5 is a timing chart for illustrating operation of the power converter protecting apparatus according to the second embodiment of the invention.

In the following, operation of the power converter protecting apparatus according to the instant embodiment of the invention will be elucidated by taking as example the power converter 3C representative of the other converters by reference to a timing chart of FIG. 5. In the normal system operation, each of the GTO switching elements 3c1 to 3c4 of the power converter 3C is repeatedly turned on/off in response to the multiple-pulse firing signals to thereby generate the converter output voltage V conforming to the normal output voltage command $E_V$. In that case, when the high-speed decision circuit 12 decides occurrence of a system fault, the single-pulse firing signal replaces the multiple-pulse firing signal and is applied to the GTO switching elements 3c1 to 3c4 in accordance with the output voltage zero command $E_0$ at the timings illustrated in FIG. 5, whereby the converter output voltage is set to zero.

At that time, the system fault indicating decision signal S generated by the high-speed decision circuit 12 is inputted to the delay circuit 16 as well. When this system fault indicating decision signal S is inputted to the delay circuit 16 continuously over a predetermined period (4 to 8 cycles), the delay circuit 16 issues the breaker control signal $S_C$ to the circuit breaker 4 for thereby closing the circuit breaker 4. As a result of this, the converter current I flows through the circuit breaker 4 while bypassing the power converter 3C, resulting in that the current I flowing through the power converter 3C becomes zero. Thus, the conducting current of the GTO switching element upon turning-off thereof can be suppressed to within the allowable current range. Because the converter current I becomes zero, each of the GTO switching elements 3c1 to 3c4 can be turned off to the nonconducting state by clearing the gate pulses from these switching elements or GTO thyristors.

Subsequently, upon removal of the system fault, the GTO switching elements 3c1 to 3c4 of the power converter 3C are repetitively turned on and off while clearing the breaker control signal $S_C$ from the delay circuit 16 by controlling the output voltage zero command $E_0$ correspondingly. Then, the circuit breaker 4 is released from the operation to allow the converter current I to flow through the power converters, whereupon the operation confirming to the normal output voltage command $E_V$ is restored.

As is apparent from the above, the function for backing up the power converter protecting operation in case a system fault continues to exist for an extended period is additionally incorporated in the power converter protecting apparatus according to the instant embodiment of the invention. The protecting operation back-up function can be realized inexpensively, because there is no need for installation of a device having a large current capacity for coping with a fault or abnormal event occurring in the electric power system.

Embodiment 3

In the case of the power converter protecting apparatus according to the first and second embodiments of the invention, the current is allowed to flow through each of the GTO switching elements 3c1 to 3c4 by effectuating the operation for setting the output voltage of the power converter to zero. However, it is possible to shunt the secondary windings of the series transformers while turning off the GTO switching elements upon occurrence of a system fault, to substantially same effect as in the case of the power converter protecting apparatuses according to the proceeding embodiments.

Figure 6:
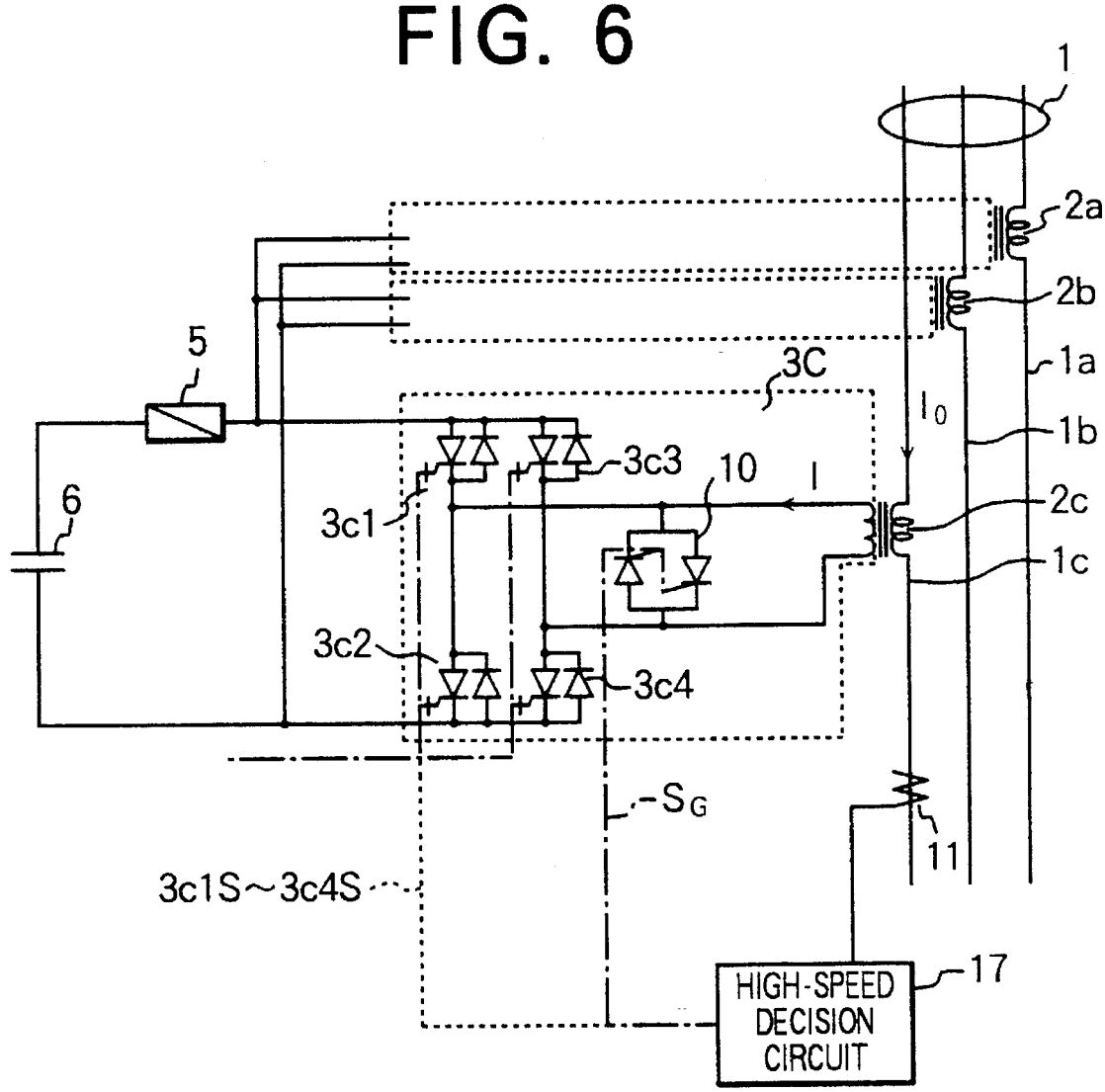
FIG. 6 is a circuit diagram showing a configuration of a power converter protecting apparatus according to a third embodiment of the present invention.

FIG. 6 is a circuit diagram showing a configuration of a power converter protecting apparatus according to a third embodiment of the present invention. In this figure, like reference characters used in FIG. 1 denote like or equivalent components shown in FIG. 1. Referring to FIG. 6, there are provided a high-speed semiconductor switch 10 which is implemented by a pair of high-speed semiconductor switching elements such as thyristors connected in anti-parallel to each other and a high-speed decision circuit 17 serving as a fault decision means for outputting a firing or gate signal $S_G$ to the high-speed semiconductor switch 10 to thereby turn on the high-speed semiconductor switch 10, while generating a turn-off signal for turning off each of the GTO switching elements 3c1 to 3c4 of the power converter 3C upon decision of occurrence of a fault in the electric power system 1.

Now, operation of the power converter protecting apparatus according to the instant embodiment will be elucidated by taking the converter 3c as the representative of the other converters. The high-speed decision circuit 17 makes decision on the basis of the system current $I_0$ detected by the current detector 11 as to whether any system fault takes place. When the occurrence of a system fault is determined, the high-speed decision circuit 17 supplies the firing or gate signal $S_G$ to the high-speed semiconductor switch 10 to thereby close the same while supplying simultaneously the turn-off signal to each of the GTO switching elements 3c1 to 3c4 of the power converter 3C to thereby open the GTO switching elements 3c1 to 3c4.

As a result of the operation described above, the system fault current is commutated to the high-speed semiconductor switch 10 bypassing the power converter 3c. Thus, the converter current I of the power converter 3C becomes zero. Besides, the conducting current of the GTO switching elements can be suppressed to within an allowable current range upon turning-off thereof. In this way, when a period in which a large system current $I_0$ is flowing is extended for some reason, the GTO switching elements 3c1 to 3c4 can be turned off without fail because the converter current I is zero. After restoration of the electric power system to the normal state, the high-speed decision circuit 17 controls turning-on/off of each of the GTO switching elements 3c1 to 3c4 in the timing shown in FIG. 3 to thereby control the output voltage to be zero, while opening the high-speed semiconductor switch 10. The operation of the power converters is then restarted. The arrangement for causing the system fault current to bypass the power converter as described above can be realized inexpensively in a compact and simple structure.

Embodiment 4

In the case of the power converter protecting apparatus according to the third embodiment of the invention described above, the high-speed semiconductor switch 10 is provided at the secondary side of the series transformer 2 for making the system fault current to bypass the secondary winding of the series transformer 2. However, when the fault state of the electric power system is extended for some reason, there may arise such situation that the fault current can no more be accommodated with the current capacity of the high-speed semiconductor switch 10. To cope with such situation, an arrangement may be adopted in which the fault current flowing through the high-speed semiconductor switch 10 is commutated to a circuit breaker having a large current capacity when the fault current continues to flow for an extended period. A fourth embodiment of the invention is directed to this arrangement.

Figure 7:
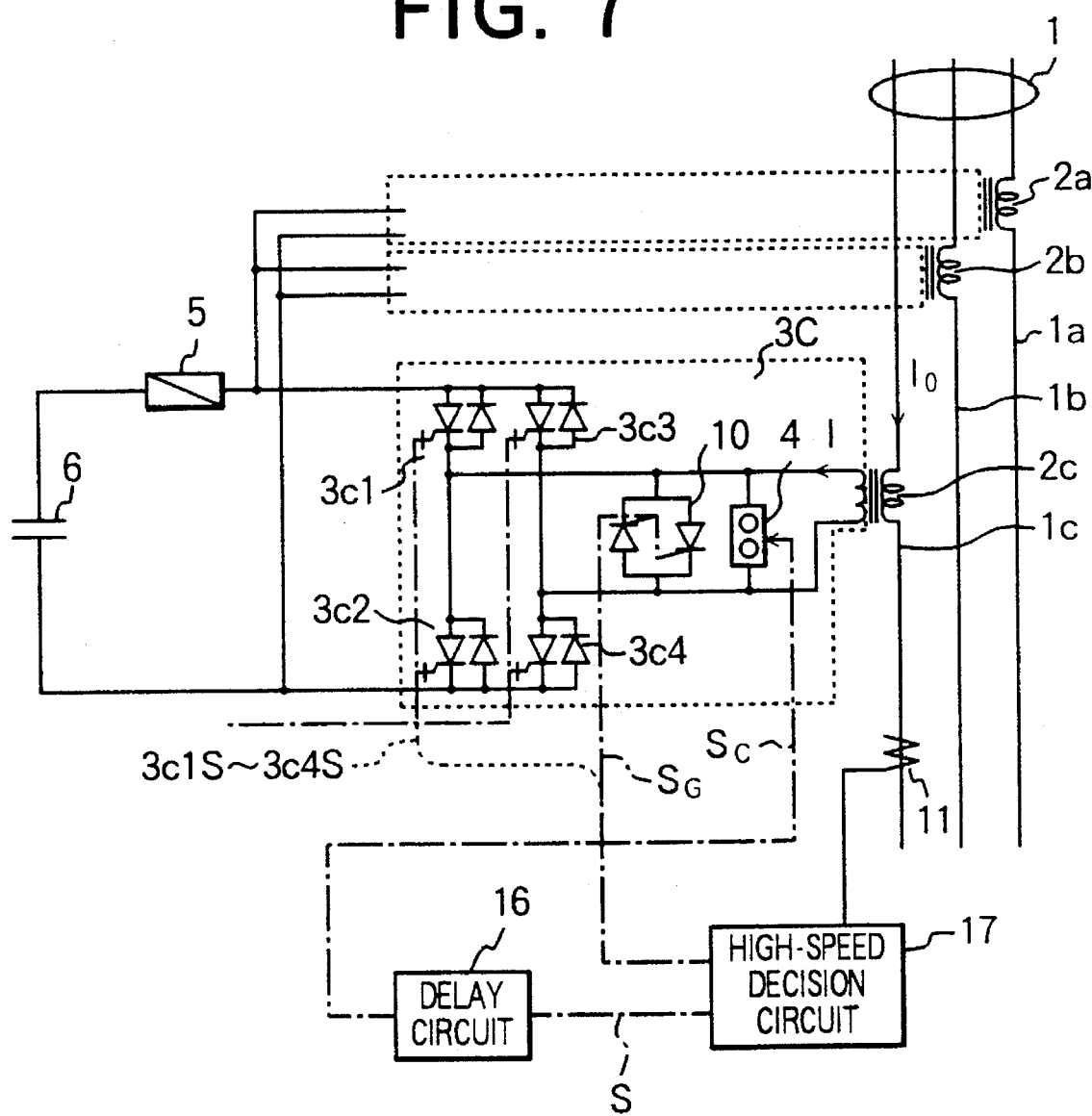
FIG. 7 is a circuit diagram showing a structure of a power converter protecting apparatus according to a fourth embodiment of the present invention.

FIG. 7 is a circuit diagram showing a structure of a power converter protecting apparatus according to the fourth embodiment of the present invention. In the figure, like reference characters as those used in FIG. 6 denote components same as or equivalent to those shown in FIG. 6. Referring to FIG. 7, a circuit breaker 4 is connected in parallel with the high-speed semiconductor switch 10. A delay circuit 16 is provided for outputting an breaker control signal $S_C$ to the circuit breaker 4 in response to the output signals of the high-speed decision circuit 17 when the system fault current continues to flow for a period longer than a predetermined time, while clearing the breaker control signal $S_C$ upon removal of the fault from the electric power system.

Now, description will turn to operation of the power converter protecting apparatus according to the instant embodiment of the invention by taking the power converter 3C as the representative. The high-speed decision circuit 17 makes decision as to occurrence of a fault event in the electric power system at a high speed on the basis of the system current $I_0$ detected by the current detector 11. When it is decided that a system fault takes place, the high-speed decision circuit 17 outputs the gate signal $S_G$ to the high-seed semiconductor switch 10 for closing it and at the same time outputs a turn-off signal to each of the GTO switching elements 3c1 to 3c4 of the power converter 3C to thereby set these switching elements to the off-state (non-conducting state).

When the system fault continues to exist for a period longer than a predetermined duration the delay circuit 16 outputs the breaker control signal $S_C$ to thereby close the circuit breaker 4. Thus, the converter current is shunted by the circuit breaker 4. After removal of the fault, the high-speed decision circuit 17 performs on/off control on each of the GTO switching elements 3c1 to 3c4 for controlling the output voltage to be zero while clearing the breaker control signal $S_C$ outputted from the delay circuit 16 to thereby open the circuit breaker 4, whereupon normal operation is restored.

With the circuit arrangement described above, the system fault current can be shunted with a simple structure and without resorting to the use of a high-speed semiconductor switch having a large current capacity which will require a cooling mechanism of large capacity.

Embodiment 5

In the case of the power converter protecting apparatus according to the fourth embodiment described above, the high-speed semiconductor switches 10 and the circuit breakers 4 are connected in paralleled to the secondary windings of the series transformers 2, respectively, wherein upon occurrence of a fault in the electric power system the converter current I is commutated to the high-speed semiconductor switch 10 before the converter current I increases excessively and thereafter the converter current I is caused to flow the circuit breaker 4 while bypassing the high-speed semiconductor switch 10, whereupon the GTO switching elements are turned off.

However, when the GTO switching elements are turned off not only upon occurrence of a system fault but also due to a fault of the power converter 3 itself, there may arise such situation that the secondary side of the series transformer 2 is opened, giving rise to appearance of an overvoltage. Besides, upon occurrence of a fault in the circuit breaker 4, the secondary side of the series transformer will be opened, incurring an overvoltage across the secondary winding.

Figure 8:
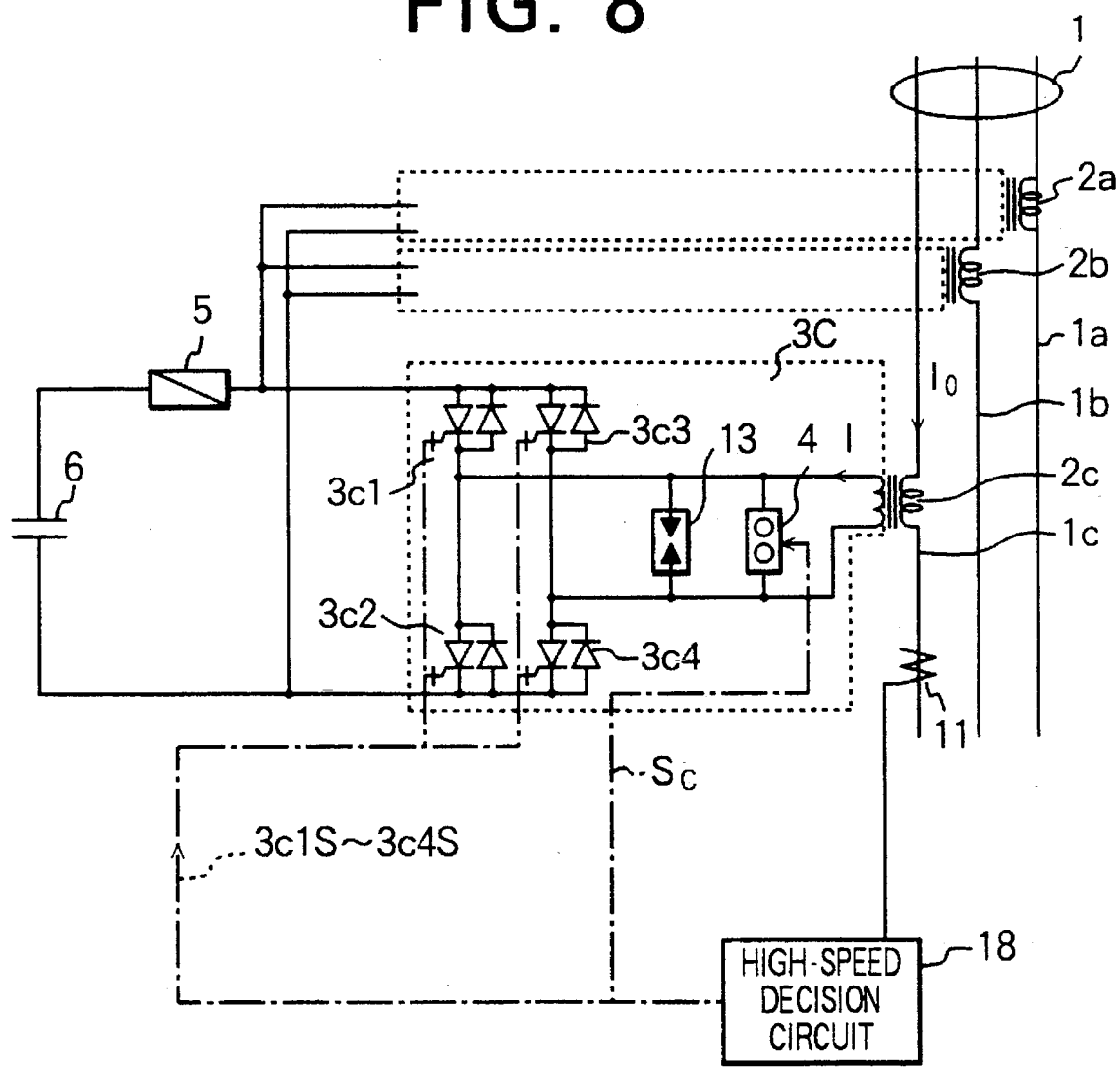
FIG. 8 is a circuit diagram showing a structure of a power converter protecting apparatus according to a fifth embodiment of the present invention.

FIG. 8 is a circuit diagram showing a structure of a power converter protecting apparatus according to the fifth embodiment of the present invention which is designed for coping with the problems mentioned above. In FIG. 8, like reference characters denote the components same as or equivalent to those described in the preceding embodiments. As can be seen in FIG. 8, an arrester 13 is provided which is connected in parallel to the secondary winding of the series transformer 2 together with the circuit breaker 4. Now, assuming that occurrence of a system fault is decided by a high-speed decision circuit 18 on the basis of the output signal of the transducer 11, the decision circuit 18 outputs the breaker control signal $S_C$, in response to which the circuit breaker 4 is closed to allow the converter current I to flow through the circuit breaker 4 while the GTO switching elements 3c1 to 3c4 are turned off.

At that time, when the secondary circuit of the series transformer 2 is opened due to a fault of the power converter 3 or when the circuit breaker 4 can not be closed for some reason after the power converter 3 assumes offstate, an overvoltage will be generated. However, because the arrester 13 is provided, as mentioned above, the overvoltage is clipped to a predetermined level, whereby the power converter 3 can be protected against application of the overvoltage.

As is apparent from the above, by providing the arrester 13 connected in parallel to the secondary winding of the series transformer 2 together with the circuit breaker 4, the latter can be put into operation within a limited time required for the arrester 13 to operate upon occurrence of the system fault. In other words, owing to the combination of the arrester 13 and the circuit breaker 4 in the protecting apparatus for the power converter 3 as described above, overvoltage applied to the power converter 3 can effectively be suppressed.

Embodiment 6

In the preceding embodiments 1 to 5, description has been directed to the bypass circuits for coping with a system fault. However, it is describable to take the measures for preventing a fault of a power converter from exerting an adverse influence to the electric power system. In more concrete, let's suppose that the GTO switching elements connected in the upper and lower arms of the bridge circuit of the power converter become inoperative in the conducting state, giving to rise of a short-circuit fault in the corresponding DC input line. In that case, the electric power system will suffer adverse influence. With a view to tackling this problem, it is proposed according to the invention incarnated in the sixth embodiment to provide a redundant protecting system in which a plurality of power converters are provided for each of the power lines, wherein any power converter suffering a fault is disconnected from the system with the operation being continued by putting into operation other normal power converter.

Figure 9:
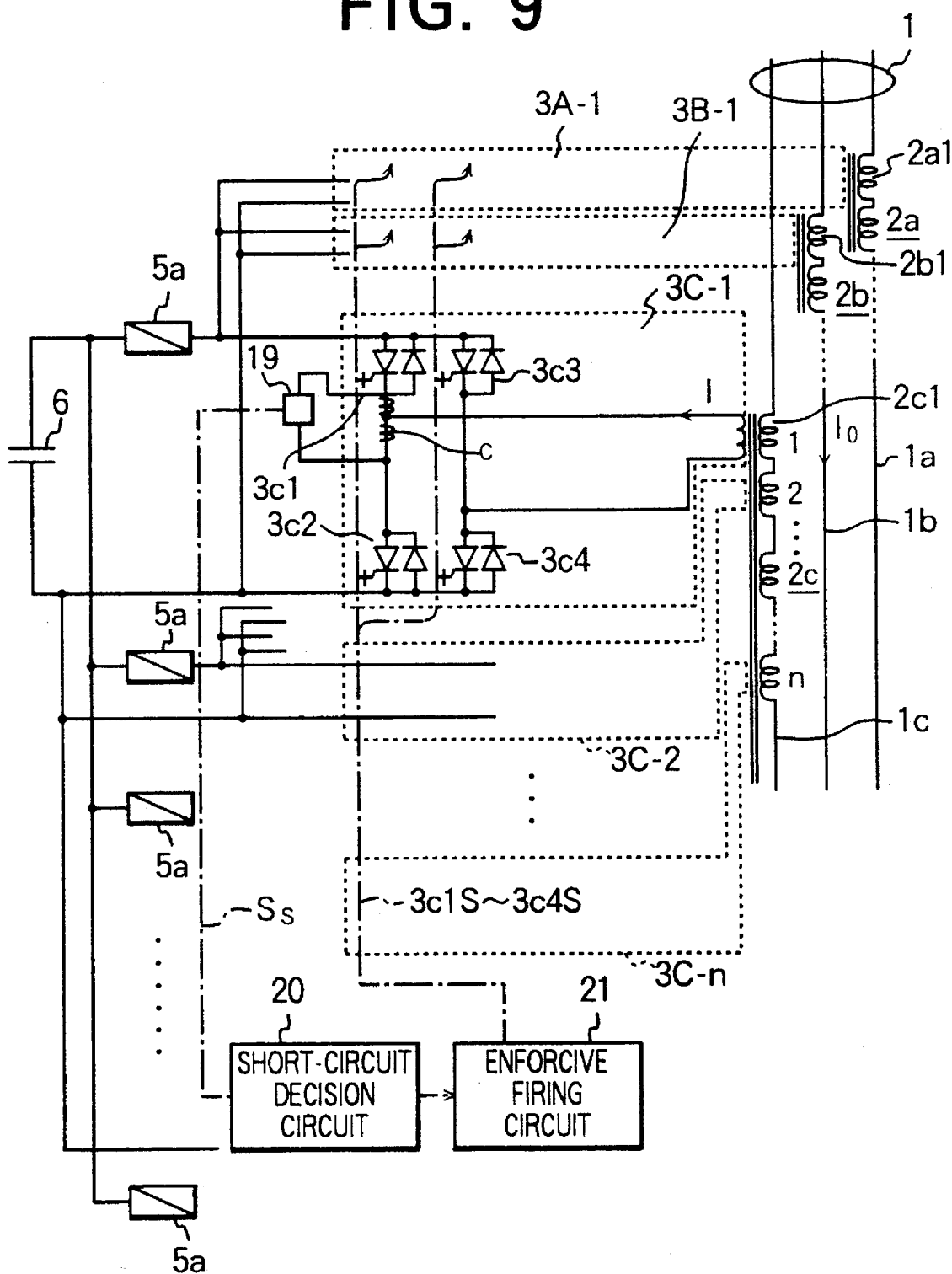
FIG. 9 is a circuit diagram showing a structure of a power converter protecting apparatus according to a sixth embodiment of the invention.

FIG. 9 is a circuit diagram showing a structure of the power converter protecting apparatus according to the sixth embodiment of the invention. As can be seen in the figure, the secondary winding of each of the series transformers $2a$ to $2c$ inserted in series in the phase power lines $1a$ to $1c$, respectively, is divided into n stages or n winding sections, wherein an additional power converter is connected to each of the n winding sections. In other words, n power converters are connected to each of the phase power lines $1a$ to $1c$.

The plus input lines of the power converters connected to the secondary winding sections (e.g. $2a1$, $2b1$, $2c1$) of a same stage of the series transformers $2a$ to $2c$, respectively, are connected together in common and then connected to one end of a DC capacitor 6 via the protecting fuse $5a$ while the corresponding minus input lines are connected together in common and then connected to the other end of the DC capacitor 6. Further, in each of the power converters, current detecting coils C are wound around connecting lines for a pair of upper and lower GTO switching elements (e.g. $3c1$ and $3c2$; $3c3$ and $3c4$), respectively.

When a short-circuit current flows through the current detecting coil C, a voltage makes appearance across the current detecting coil C. When this voltage is detected by a short-circuit detector 19, a fault detection signal $S_S$ is inputted to a sort-circuit decision circuit 20 in the form of a signal which can identify the secondary winding section to which the fault suffering power converter 3 is connected. In response, the short-circuit decision circuit 20 sends the short-circuit detection signal $S_S$ to an enforcive firing circuit 21, which then responds to the signal $S_S$ to thereby supply the firing signals to the GTO switching elements of all the power converters which are connected to the secondary winding sections of the same stage to which the power converter suffering the fault is connected.

Parenthetically, the DC capacitor 6 connected in parallel to the DC input lines of the power converters is usually of a large capacity, which means that the impedance of the DC circuit is small. Accordingly, when a short-circuit fault occurs in cascade in the GTO switching elements constituting the power converter, a large current will flow through the series circuit, rendering it impossible to protect the GTO switching elements.

Now, description will turn to operation of the power converter protecting apparatus according to the instant embodiment of the invention. Assuming that a short-circuit fault takes place in cascade simultaneously in the GTO switching elements $3c1$ and $3c2$ of the converter $3C-1$ which is connected to the secondary winding section $2c1$ of the first stage of the series transformer $2c$ which is connected in series to the phase power line $1c$, a corresponding short-circuit current flows through the current detecting coil C, whereby a voltage is induced in this coil C. This voltage is detected by the short-circuit detector 19, whereby the short-circuit detection signal $S_S$ is supplied to the short-circuit decision circuit 20 in the form of an identification signal which identifies the secondary winding section $2c1$ of the first stage of the series transformer $2c$ to which the power converter $3C-1$ suffering from the short-circuit fault is connected.

The short-circuit decision circuit 20 then decides on the basis of the short-circuit detection signal $S_S$ to thereby identify the stage of the secondary winding section $2c1$ to which the power converter $3C-1$ suffering from the cascade short-circuit fault is connected. When it is decided that the short-circuit fault takes place in the power converter $3C-1$ connected to the first stage of the secondary winding section $2c1$, the enforcive firing circuit 21 is activated to thereby supply the firing signals to all the GTO switching elements of the power converters ($3A-1$, $3B-1$, $3C-1$) connected to the secondary winding sections ($2a1$, $2b1$, $2c1$) of the first stage of the series transformers ($2a$, $2b$ and $2c$) inserted in series in the three phase power lines, respectively.

In this manner, when the DC short-circuit fault occurs in one bridge arm in the state in which the GTO switching elements belonging to that arm are both conducting, all the GTO switching elements of the power converters connected to the secondary winding sections of the same stage are fired to thereby increase the current flowing through the protecting fuse $5a$ in accordance with a function given by $I^2t$ (where I represents the current and t represents a time lapse) for thereby breaking the protecting fuse $5a$ with the short-circuit current before it exceeds the allowable current capacity of the GTO switching elements. Upon melting of the protecting fuse $5a$, the power converters connected to the secondary winding sections of the first stage of the series transformers inserted in the three phase power lines, respectively, are disconnected from the DC capacitor 6. By forcibly turning on all the GTO switching elements, the secondary windings of the series transformers 2 assume the short-circuited state. However, the secondary winding currents flowing through the secondary windings are limited to a value determined by the transformation ratio. Thus, occurrence of overcurrent is prevented.

In this manner, by dividing the secondary winding of each of the series transformers by n and adopting the combination of the protecting fuse $5a$ and the enforcive firing circuit 21 in each of the power converters (3A, 3B, 3C), as described above, protection of the GTO elements of the power converters can be ensured. Furthermore, when a short-circuit fault takes place, the power converters connected to the secondary winding sections of the same stage as the power converter suffering the short-circuit fault are disconnected from the DC capacitor, and the system operation is continuously maintained by those power converters which are connected to the secondary winding sections of the other (n-1) stages. Thus, the power converter protecting apparatus of a redundant structure assuring high reliability can be realized in a compacted package at low cost.

The foregoing description has been made in conjunction with the power converters connected to the secondary winding sections of the first stage ($2a1$, $2b1$, $2c1$). However, it goes without saying that the protection can be ensured for the power converters connected to any stage of the secondary winding section with a same circuit configuration having a redundancy.

Embodiment 7

In the case of the power converter protecting apparatus according to the sixth embodiment of the invention, when the cascade short-circuit fault occurs in a power converter connected to a given stage of the secondary winding section of the series transformer 2, all the GTO switching elements of the power converters connected to the secondary winding sections of the same stage as the given one are fired to thereby melt the protecting fuse $5a$ in order to disconnect all the power converters 3 connected to the above-mentioned secondary winding sections from the DC circuit with a view to ensure protection for the GTO switching elements.

In this conjunction, it is however noted that even if the power converter suffering the cascade short-circuit fault is disconnected from the DC circuit, an excessively large short-circuit current may flow to the power converter suffering the short-circuit fault from the associated secondary winding of the series transformer, whereby the normal GTO switching elements may possibly be damaged. Accordingly, it is desirable to prevent the short-circuit current from flowing to the power converter. Besides, it is preferred to interrupt the current flowing through the electric power system in order to remove the power converter suffering the short-circuit fault from the electric power system.

Figure 10:
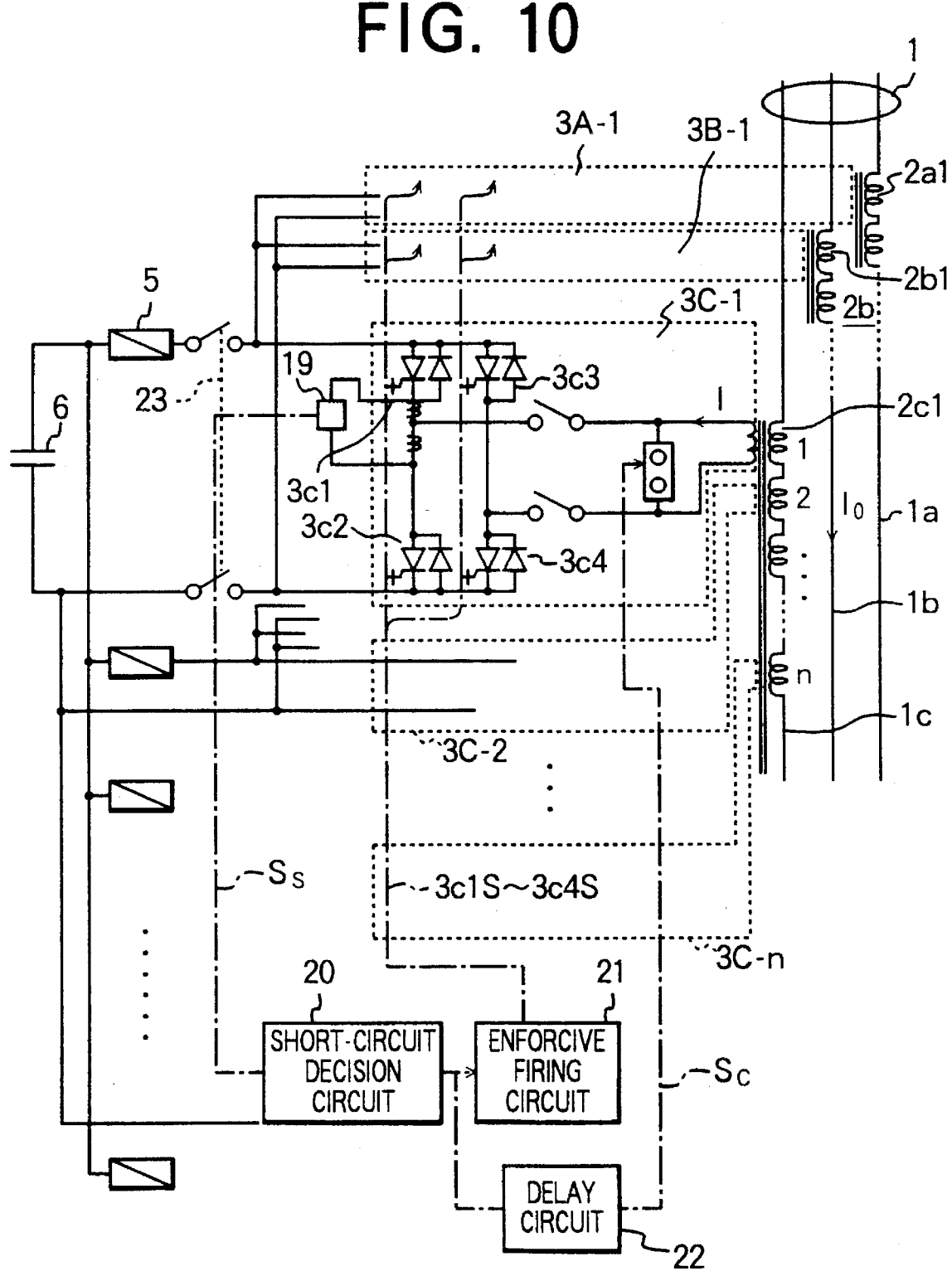
FIG. 10 is a circuit diagram showing a structure of a power converter protecting apparatus according to a seventh embodiment of the present invention.

FIG. 10 is a circuit diagram showing a structure of a power converter protecting apparatus according to a seventh embodiment of the present invention which is designed to facilitate maintenance of the power converters. In FIG. 10, like reference characters as those used in FIG. 9 denote like or equivalent components. Referring to FIG. 10, a disconnecting switch 23 is inserted in the DC line of each power converter. Furthermore, a disconnecting switch 24 is inserted between the AC output line of the power converter 3 and the secondary winding, while a circuit breaker 4 is connected in parallel with the secondary winding. Additionally, a delay circuit 22 is provided for allowing the breaker control signal $S_C$ to be supplied to the circuit breaker 4 from the short-circuit decision circuit 20 upon lapse of a predetermined time after the input of the short-circuit detection signal $S_S$ to the short-circuit decision circuit 20. The disconnecting switches 23 and 24, the circuit breaker 4 and the delay circuit 22 are provided in association with each of the power converters connected to the respective secondary winding sections.

Next, description will be made of operation of the power converter protecting apparatus according to the instant embodiment of the invention by taking the power converter 3C-1 as the representative example. It is assumed, by way of example, that a cascade short-circuit fault takes place in the converter connected to the first stage secondary winding section 2c1 of the series transformer 2c inserted in the phase power line 1c. Then, the power converters 3 connected to the first stage secondary winding sections of all the series transformers (2a, 2b, 2c) are set to the conducting state through cooperation of the short-circuit decision circuit 20 and the enforcive firing circuit 21 as described previously, whereby the associated protecting fuse 5a is fused to disconnect all the power converters 3 connected to the first stage secondary winding sections (2a1, 2b1, 2c1), respectively.

In that case, when the power converter 3C-1 suffering the cascade short-circuit fault is left in the state connected to the secondary winding, a large short-circuit current may flow to that power converter to damage the normal GTO switching elements thereof. Accordingly, when the short-circuit detection signal $S_S$ is inputted continuously from the short-circuit decision circuit 20 for a duration longer than a predetermined time, the delay circuit 22 supplies the breaker control signal $S_C$ to the circuit breaker 4 connected to the AC output side of the power converter suffering the cascade short-circuit fault to thereby short-circuit the associated secondary winding (2c1). As a result of this, the short-circuit current can be commutated to the circuit breaker 4 while bypassing the power converter suffering the short-circuit fault.

Furthermore, by opening the disconnecting switches 23 and 24 inserted, respectively, in the DC input side and the AC output side of the power converter suffering the short-circuit fault to thereby disconnect fault suffering the power converter from the electric power system, it is possible to repair that power converter while maintaining alive the electric power system.

Embodiment 8

As description hereinbefore, in the case of the power converter protecting apparatus according to the seventh embodiment of the invention, when the cascade short-circuit fault takes place in a give one of power converters connected to a secondary winding section of a series transformer, the GTO switching elements of all the power converters connected to the secondary winding sections of the same stage as that to which the fault suffering power converter is connected are turned on to thereby break the protecting fuse 5 for disconnecting all of the above-mentioned power converters from the DC circuits in order to protect the GTO switching elements. Furthermore, the flow of the short-circuit current into the fault-suffering power converter is prevented by closing the circuit breaker.

Figure 11:
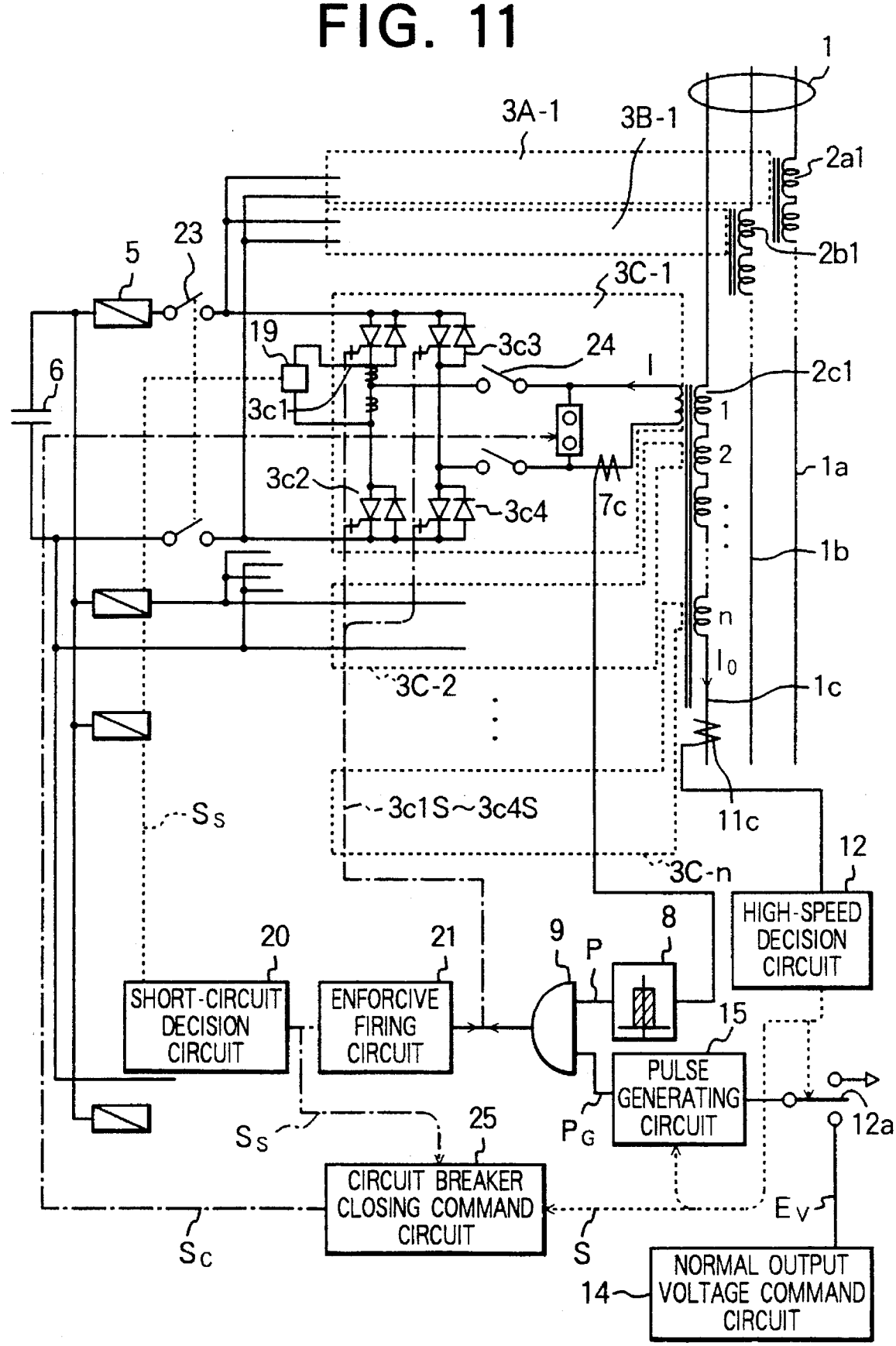
FIG. 11 is a circuit diagram showing a structure of a power converter protecting apparatus according to an eighth embodiment of the present invention.

The power converter protecting apparatus of such arrangement may preferably be equipped with an apparatus for protecting the power converters against system fault as described hereinbefore in conjunction with the first embodiment of the invention. FIG. 11 is a circuit diagram showing a structure of a power converter protecting apparatus which includes a short-circuit fault protecting circuit and a system fault protection circuit according to the eighth embodiment of the invention. In FIG. 11, like reference characters as those used in FIGS. 1 and 10 denote same or equivalent components. Referring to FIG. 11, there is provided a circuit breaker closing command circuit 25 which responds to the decision signal S supplied from the high-speed decision circuit 12 or the short-circuit detecting signal $S_S$ supplied from the short-circuit decision circuit 20 to output a breaker control signal $S_C$ to the circuit breaker 4 with a delay of a predetermined time.

Figure 3:
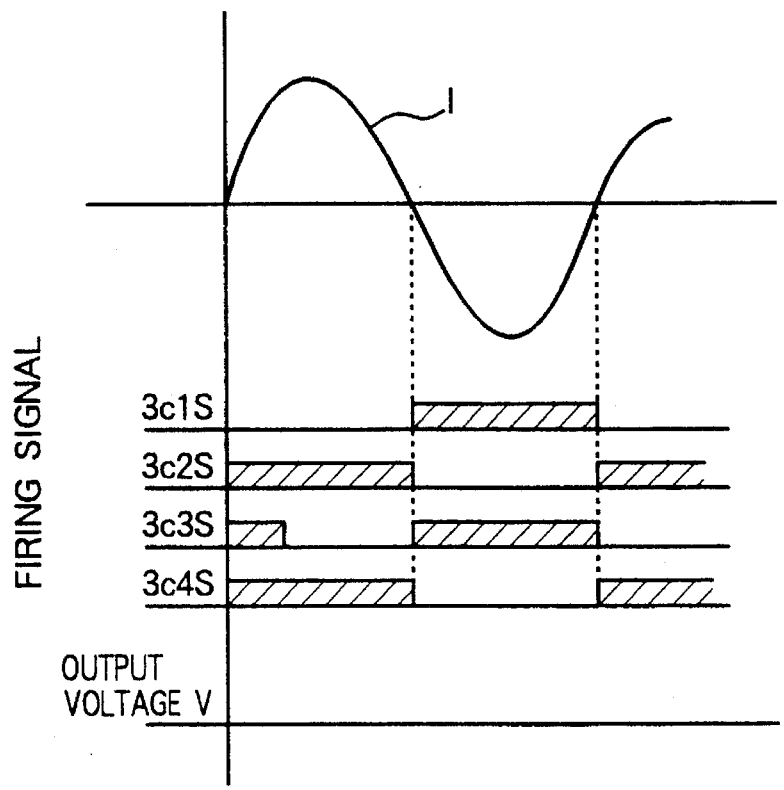
FIG. 3 is a timing chart showing a relation between firing signals and a system current upon occurrence of a system fault of a power converter protecting apparatus according to the first embodiment of the invention.

Upon detection of the system fault by the high-speed decision circuit 12, the firing signals 3c1S to 3c4S are outputted to the GTO switching elements 3c1 to 3c4 in response to the output voltage zero command $E_0$ in the timing illustrated in FIG. 3, whereby the power converter output voltage is set to zero.

In that case, the high-speed decision circuit 12 supplies the fault decision signal S to the circuit breaker closing command circuit 25 as well. When the fault decision signal S continues to exist over a predetermined time (e.g. in a range of 4 to 8 cycles), the breaker control signal $S_C$ is outputted to the circuit breaker 4 to thereby close the circuit breaker 4. As a result, the converter current I is commutated to the circuit breaker 4, whereby the current flowing to the power converter 3 becomes zero. In this manner, the conducting currents of the GTO switching elements upon turning-off thereof can be suppressed to within the allowable current capacity of the switching element.

On the other hand, when a cascade short-circuit fault occurs in a power converter 3 connected to the secondary winding section 2c1 of the first stage of a series transformer 2 inserted in the phase power line 1c, the power converter 3 connected to the first stage secondary winding sections of all the series transformers 2 are turned on through cooperation of the short-circuit decision circuit 20 and the enforcive firing circuit 21 to fuse the protecting fuse 5a, whereby all the power converters 3 connected to the first stage secondary winding sections of the series transformers 2 are disconnected from the DC circuit.

Furthermore, when the short-circuit detecting signal $S_S$ is continuously applied to the circuit breaker closing command circuit 25 from the short-circuit decision circuit 20 over a predetermined time, the breaker control signal $S_C$ is supplied to the circuit breaker 4 connected in the AC output circuit of the power converter 3 suffering the cascade short-circuit fault to thereby close the circuit breaker 4 for shunting the secondary winding section. As a result of this, the short-circuit current can be commutated to the circuit breaker 4 while bypassing the power converter.

As is apparent from the above, by combining the structure of the power converter protecting apparatus according to the first embodiment with that of the seventh embodiment, the power converter can be protected against both the secondary winding and the short-circuit fault while allowing the operation of the system to be continued.

Embodiment 9

The first to eighth embodiments of the present invention described so far are applied to the protection of the power converters connected in series to the electric power system. However, the power converter protecting apparatus according to the present invention can find application to the protection of the power converters connected in parallel to the electric power system as well.

Figure 12:
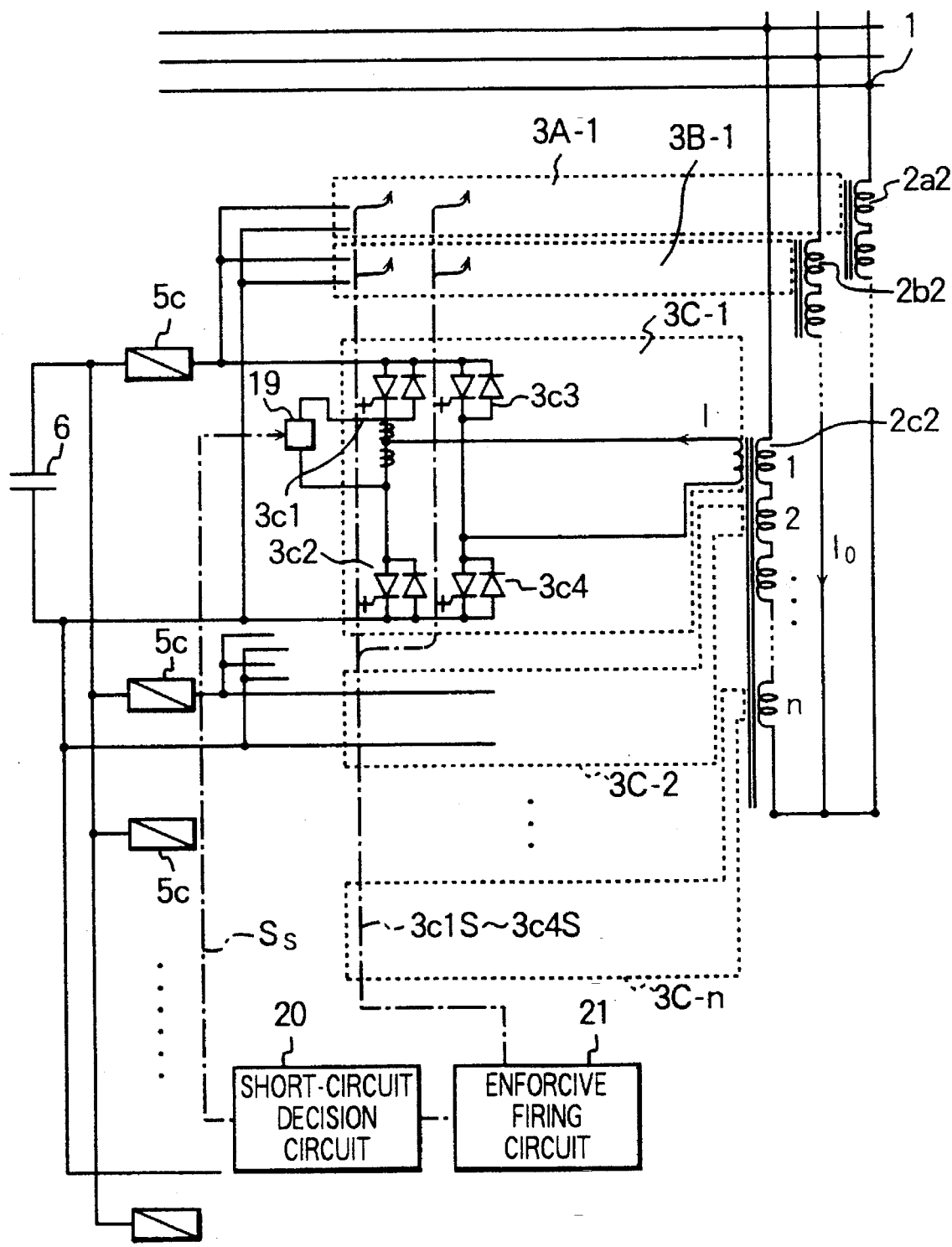
FIG. 12 is a schematic circuit diagram showing a power converter protecting apparatus for power converters which are connected in parallel to an electric power system.

FIG. 12 is a schematic circuit diagram showing a power converter protecting apparatus for the power converters which are connected in parallel to the electric power system. The power converter protecting apparatus according to the instant embodiment of the invention differs from the sixth embodiment except that the secondary winding is divided into n sections. When a cascade short-circuit fault takes place in a given one of the power converters 3 connected in parallel with the electric power system, this fault event is detected by the short-circuit detector 19. The short-circuit decision circuit 20 responds to the short-circuit detection signal $S_S$ supplied from the short-circuit detector 19 to determine or identify the stage of the section of the secondary winding to which the converter suffering the cascade short-circuit fault is connected. On the basis of the result of the decision, the enforcive firing circuit 21 generates the firing signals 3c1S to 3c4S to all the converters connected to the secondary winding sections of the same stage as that to which the short-circuit fault suffering converter is connected. With this arrangement, the advantageous effects similar to those described previously in conjunction with the sixth embodiment can be obtained.

Embodiment 10

Figure 13:
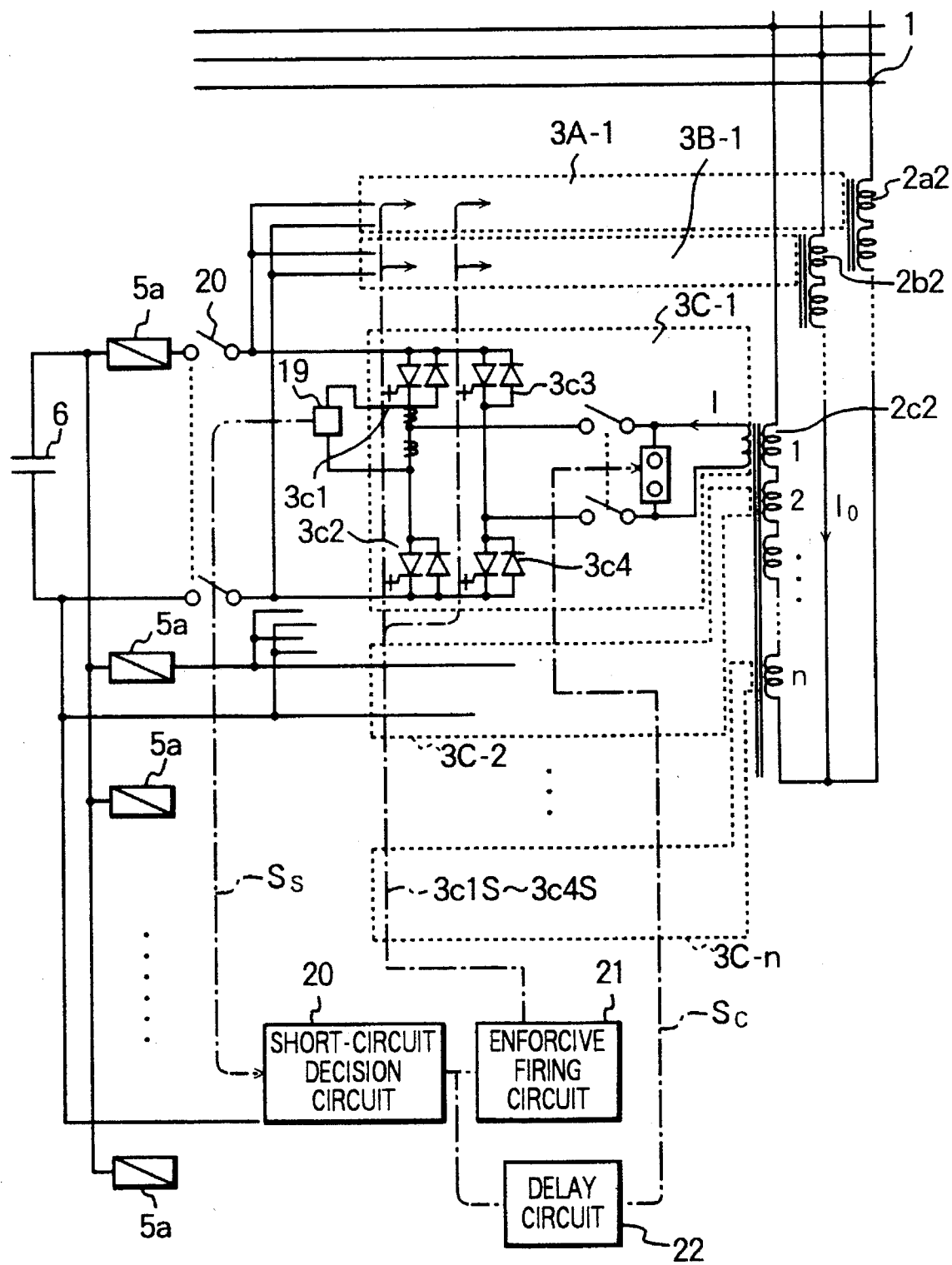
FIG. 13 is a circuit diagram showing a structure of a power converter protecting apparatus according to a tenth embodiment of the present invention.
Figure 14:
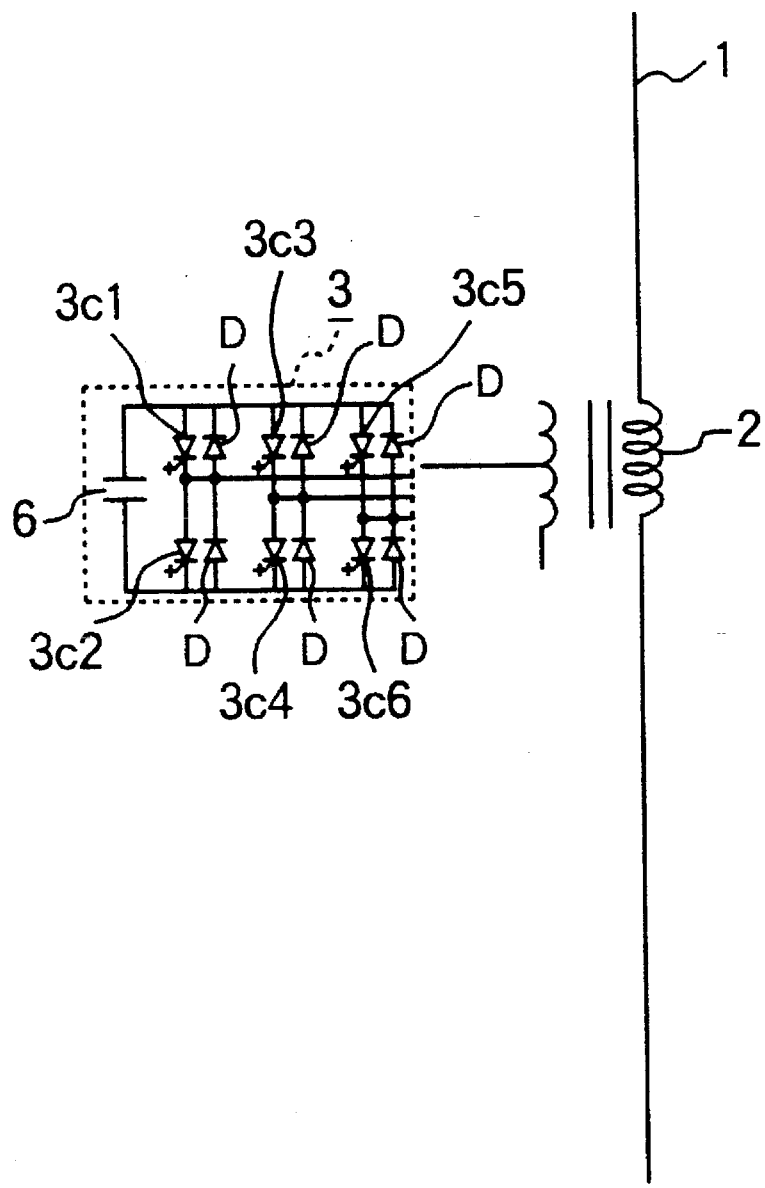
FIG. 14 is a schematic circuit diagram showing a configuration of a conventional power converter connected in series to an electric power system.

FIG. 13 is a schematic circuit diagram showing a power converter protecting apparatus for the power converters which are connected in parallel to the electric power system. The power converter protecting apparatus according to the instant embodiment of the invention differs from the seventh embodiment except that the secondary winding is divided into n sections. In operation, assuming, by way of example, that a cascade short-circuit fault takes place in the power converter 3 connected to a secondary winding section of the first stage of a series transformer, then the GTO switching elements of all the power converters connected to the first stage winding sections of all the transformers are turned on, whereby the protecting fuse 5a is broken which results in that all the power converter 3 connected to the secondary winding sections of the first stage are disconnected from the respective DC circuits.

In that case, when the power converter 3 suffering from the cascade short-circuit fault is left in the state connected to the secondary winding, the short-circuit current will flow to the power converter 3 from the secondary winding, which may damage the normal GTO switching elements of the power converter 3. Accordingly, when the short-circuit detecting signal $S_S$ continues to be detected over a predetermined time, the delay circuit 22 outputs the circuit breaker control signal to the circuit breaker 4 connected to the AC side of the power converter 3 suffering the short-circuit fault, to thereby cause the circuit breaker 4 to shunt the secondary winding. As a result of this, the short-circuit current flows through the circuit breaker 4 while bypassing the fault suffering power converter 3.

Besides, by opening the disconnecting switches 23 and 24 inserted in the DC input side and the AC input side, respectively, of the short-circuit fault suffering power converter, it is possible to repair the same in the state in which the electric power system is maintained alive.

In the case of the power converter protecting apparatuses according to the ninth and tenth embodiments of the invention, the system voltage is applied across the (n-1) winding sections. Accordingly, by designing previously the transformers and the power converters in consideration of the fact that a voltage as (n/n-1) times as high as the system voltage is applied to the power converter and the transformer, to thereby implement the power converter protecting apparatus with redundancy, there can be realized a power converter protecting apparatus of high reliability at low cost.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it has been assumed that the power converter protecting apparatus according to the invention is applied to the three-phase electric power system, the inverter can equally be applied to other type power supply systems or sources. Besides, although the DC circuit is assumed to be constituted by a DC capacitor, it may be replaced by a self-excitation type BTB, substantially to the same advantageous effects.

Accordingly, all suitable modifications and equivalents may be resorted to, falling within the spirit and scope of the invention.

What is claimed is:

1. A power converter protecting apparatus for an electric power system, comprising:

a plurality of series transformers, each transformer being connected in series to a respective phase power line of the electric power system;

a plurality of power converters, each power converter being connected in a secondary winding of a respective one of said plurality of series transformers;

first current detecting means for detecting system currents flowing through the phase power lines;

second current detecting means for detecting converter currents flowing to said power converters from the secondary windings of said plurality of series transformers;

fault decision means for outputting a fault decision signal upon decision of occurrence of a system fault in said electric power system on the basis of the system currents;

output voltage command means for issuing an output voltage zero command responsive to said fault decision signal; and control signal output means for supplying control signals to said power converters for setting to zero the outputs of said power converters in response to said output voltage zero command at a time point when the converter current as detected during occurrence of said system fault decreases below an allowable breaking current of said power converters.

2. The power converter protecting apparatus according to claim 1, further comprising:

a circuit breaker connected in parallel with a respective secondary winding of each of said plurality of series transformers; and a delay circuit coupled to said fault decision means to output a closing signal to said circuit breaker with a time delay, said delay circuit being responsive to said fault decision signal from said fault decision means and said delay circuit outputting the closing signal continuously over a predetermined time period.

3. A power converter protecting apparatus for an electric power system, comprising:

a plurality of series transformers, each transformer being connected in series to a respective phase power line of the electric power system;

a plurality of power converters, each power converter being connected in a secondary winding of a respective one of said plurality of series transformers;

a plurality of semiconductor switching elements, each semiconductor switching element being connected in parallel to a secondary winding of a respective one of said plurality of series transformers;

first current detecting means for detecting system currents flowing through the phase power lines; and system fault decision means for outputting a turn-on signal to said plurality of semiconductor switching elements and outputting simultaneously a turn-off signal to said plurality of power converters upon decision of occurrence of a system fault, said system fault decision means being responsive to the system currents.

4. The power converter protecting apparatus according to claim 3, further comprising:

a circuit breaker connected in parallel with each of said secondary windings of said series transformers; and a delay circuit coupled to said system fault decision means to output a closing signal to said circuit breaker with a delay time responsive to said decision signal from said system fault decision means, said delay circuit outputting the closing signal continuously over a predetermined time period.

5. A power converter protecting apparatus for an electric power system, comprising:

a plurality of series transformers, each series transformer having a plurality of primary windings connected in series to a phase power line of an electric power system, each of said series transformers having a secondary winding divided into a plurality of winding sections;

a plurality of groups of power converters, each group power converters including a plurality of individual power converters and each individual power converter being connected to a respective secondary winding section of a respective one of said plurality of series transformers, each one of the plurality of individual power converters having first and second input lines, the first input line including a protecting fuse;

a capacitor connected across the first and second input lines of each one of the plurality of individual power converters;

short-circuit detecting means provided in association with said plurality of individual power converters for generating short circuit detection signals indicative of a short circuit fault condition of one or more of the plurality of individual power converters;

short-circuit decision means for determining the secondary winding section to which the power converter suffering from a short-circuit fault is connected responsive to one of the short-circuit detection signals; and an enforcive firing circuit for generating firing signals responsive to a decision of occurrence of a short-circuit fault in a given one of said power converters to break the protecting fuse of the power converter having the short-circuit fault.

6. The power converter protecting apparatus according to claim 5, further comprising:

a plurality of circuit breakers, each circuit breaker connected in parallel to a secondary winding of a respective one of said series transformers; and delay circuit means coupled to each of said circuit breakers for generating a delayed closing signal responsive to the decision of the short-circuit fault by said short-circuit decision means.

7. A power converter protecting apparatus according to claim 6, further comprising:

first current detecting means for detecting converter currents flowing to said power converters from the secondary windings;

fault decision means for outputting a fault decision signal upon decision of occurrence of a system fault, said fault decision means being responsive to the detected system current;

output voltage command means for issuing an output voltage zero command responsive to said decision signal;

control signal output means for issuing an output voltage zero command responsive to said decision signal;

control signal output means for supplying a control signal to said plurality of power converters responsive to said output voltage zero command at a time point when the converter current as detected during occurrence of said system fault decreases below an allowable breaking current of said plurality of power converters;

said delay circuit means outputting the closing signal to the plurality of circuit breakers with a delay of a predetermined time after the decision of occurrence of a system fault made by said fault decision means.

8. A power converter protecting apparatus according to claim 6, wherein each power converter includes a first disconnecting switch inserted in series in the first input line and a second disconnecting switch inserted in series in the second input line.

9. The power converter protecting apparatus of claim 1 wherein each of said plurality of power converters includes first, second, third and fourth switching elements, the output command signal causing the first and fourth switching elements to be turned on while the second and third switching signals are turned off.

10. A power converter protecting apparatus for an electric power system, comprising:

- a plurality of series transformers, each transformer being connected in series to a respective phase power line of the electric power system;
- a plurality of power converters, each power converter being connected to a secondary winding of a respective one of said plurality of series transformers;
- current detecting means for detecting system currents flowing through the phase power lines;
- a plurality of circuit breakers, each circuit breaker being connected in parallel to a secondary winding of a respective one of said plurality of series transformers;
- system fault decision means coupled to said plurality of circuit breakers and to said current detecting means for outputting a breaker control signal to close said circuit breakers responsive to detection of current by said current detecting means; and
- a plurality of arresters, each arrester being connected in parallel to a secondary winding of a respective one of said plurality of series transformers to prevent an overvoltage from being applied to said plurality of power converters.

\* \* \* \* \*